United States Patent [19]

Majima

[11] Patent Number: 4,721,195
[45] Date of Patent: Jan. 26, 1988

[54] CLUTCH COOLING SYSTEM

[75] Inventor: Hidekazu Majima, Yawata, Japan

[73] Assignee: Kabushiki Kaisha Daikin Seisakusho, Osaka, Japan

[21] Appl. No.: 718,304

[22] Filed: Apr. 1, 1985

[30] Foreign Application Priority Data

Apr. 9, 1984 [JP] Japan .................. 59-71564

[51] Int. Cl.⁴ ............................. F16D 13/72
[52] U.S. Cl. ..................... 192/113 A; 74/519; 192/99 S
[58] Field of Search ............... 192/99 A, 99 S, 99 R, 192/113 A, 113 R; 74/519, 587

[56] References Cited

U.S. PATENT DOCUMENTS

| | | | |
|---|---|---|---|
| 2,060,773 | 11/1936 | Pearmain | 192/113 A |
| 3,353,642 | 11/1967 | Thelander | 192/99 S |
| 4,524,856 | 6/1985 | Renaud | 192/99 S |

FOREIGN PATENT DOCUMENTS

| | | | |
|---|---|---|---|
| 2514532 | 10/1975 | Fed. Rep. of Germany | 192/113 A |
| 0190127 | 11/1982 | Japan | 192/99 S |
| 2097873 | 11/1982 | United Kingdom | 192/113 A |

*Primary Examiner*—Rodney H. Bonck
*Attorney, Agent, or Firm*—Armstrong, Nikaido, Marmelstein & Kubovcik

[57] ABSTRACT

In a clutch having a housing and a release fork with a clutch release bearing on one end of the fork in the housing and with its outer end projecting out of the clutch housing and connected to a clutch operating mechanism; a clutch cooling system in which the release fork is hollow and an air outlet opening and an air inlet opening are provided on the release fork at the inside and the outside of the clutch housing, respectively, for feeding cooling air from the outside of the housing to the clutch in the housing for cooling the clutch.

1 Claim, 2 Drawing Figures

CLUTCH COOLING SYSTEM

FIELD OF THE INVENTION

This invention relates to a clutch cooling system suitable for a friction clutch of an automobile, an agricultural machine, a construction machine etc.

DESCRIPTION OF THE PRIOR ART

In a clutch housed in a clutch cover, air around the clutch at the time of clutch rotation is sucked from a central part of a clutch cover assembly into the cover and flows out of an outer peripheral part of the clutch cover assembly.

In order to improve the cooling effect of the clutch cover assembly, various means have been proposed, in which a special purpose pipe is extraordinarily provided to draw air from outside of the housing into the central part of the clutch cover assembly.

However, these means have disadvantages not only that it is necessary to use special purpose suction pipe but also that the clutch housing must be provided with means for attaching the pipe.

SUMMARY OF THE INVENTION (Object of the Invention (a)

An object of this invention is to eliminate the necessity of using the special purpose suction pipe and further to preclude the necessity of special means on the clutch housing for attaching such pipe.

(b)

Another object of this invention is to intend thereby to lower the temperature in the clutch assembly without increasing the number of components and at the same time to simplify the clutch mechanism and reduce clutch weight.

(Composition of the Invention)

In the present invention, the clutch release fork connected to a clutch release bearing and projecting out of a clutch housing is connected to a clutch operating mechanism. A clutch cooling system, in which the release fork is formed into a hollow shape with an air outlet opening and an air inlet opening is provided on the release fork at both inside and outside of the clutch housing respectively.

DETAILED DESCRIPTION OF THE INVENTION

Figure 1:
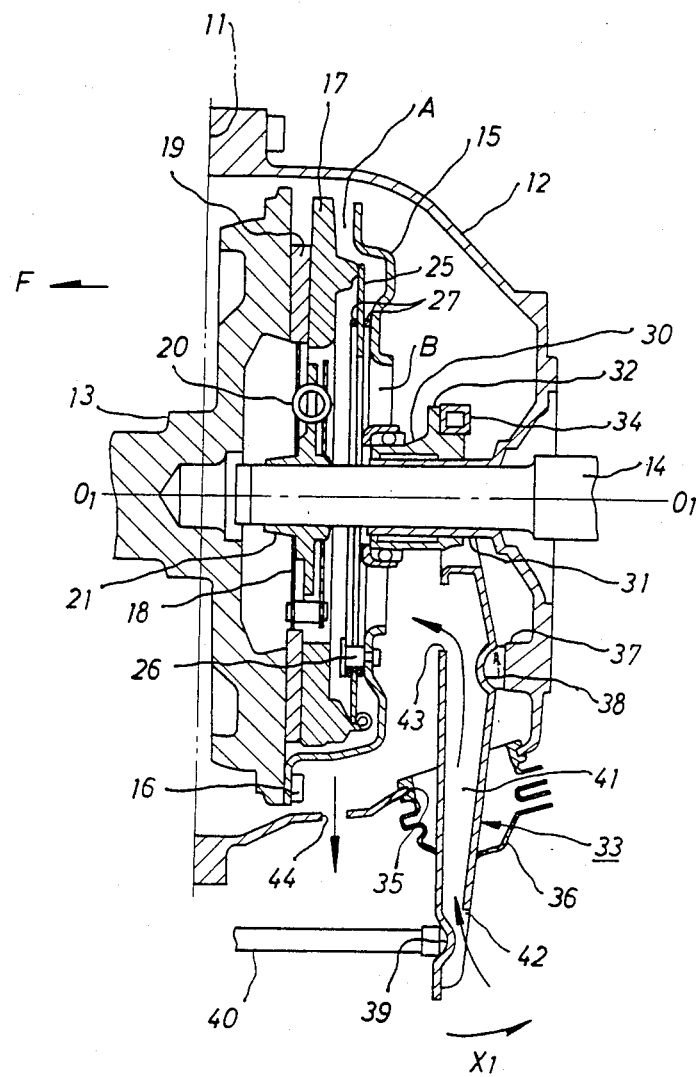
FIG. 1 is a vertical sectional side view of a clutch cooling system according to one embodiment of the invention.

In FIG. 1 (and arrow F indicating a front side), an input flywheel 13 and an output shaft 14 are disposed concentrically and face to face in a clutch housing 12 fixed to a crank case 11. A clutch cover 15 is fastened with a bolt 16 to an outer peripheral side portion of the flywheel 13, and an annular pressure plate 17 is disposed concentrically in a space formed by the flywheel 13 and the clutch cover 15. The pressure plate 17 is connected freely swingingly in a direction of a center line 01—01 to the clutch cover 15 by a strap plate, (not shown). A clearance port is formed between the flywheel 13 and the clutch cover 15 at a part of the strap plate. A facing 19 provided at an outer peripheral part of a concentric clutch disc 18 is disposed between the pressure plate 17 and the flywheel 13. The facing 19 is connected through a damper mechanism 20 (for example, a torsion spring etc.) to a central hub 21, and the hub 21 spline fits onto the output shaft 14 and is freely slidingly in the direction of center line 01—01. The other end of the output shaft 14 is connected to a transmission (not shown).

An outer peripheral end of a concentric diaphragm spring 25 contacts with a rear side face of the pressure plate 17. Diaphragm spring 25 is supported by plural stud pins 26 fixed to the clutch cover 15 and annular and concentric wire rings 27 in such a manner that spring 25 can be compressed with the wire rings 27 acting as a fulcrum. A concentric release bearing 30 contacts with an inner peripheral end of the diaphragm spring 25 from the back of the spring. and an inner peripheral part of the release bearing 30 fits freely slidingly onto a cylindrical part 31 formed on an inner peripheral side of the clutch housing 12. Further, an annular clearance B is formed between an inner peripheral side end of the clutch cover 15 and the release bearing 30.

An annular part 34, formed at a clutch inner peripheral side of the release fork 33, contacts the rear side face of a flange 32 formed at a rear part of the release bearing 30. Release fork 33 extends downward from the annular part 34 and its lower part projects outside from a hole 35 provided on the clutch housing 12. A bellows 36 is provided between the hole 35 and the release fork 33. In the clutch housing 12, a concave part 38 formed at a central portion of a rear side of the release fork 33 engages with a spherical seat 37 projecting forward and formed on an inner side of the clutch housing 12 in such a manner that the release fork 33 can pivot on the spherical seat 37 in a direction of arrow X1 or in a reverse direction thereof. A rear end of a link rod 40 connected to a clutch pedal (not shown) contacts with a concave part 39 formed on a lower-end front face of the release fork 33.

The release fork 33 has a hollow arm and has a channel 41 in its inside. An air inlet opening 42, interconnecting channel 41 to the outside of clutch housing 12, is formed at a lower end of the release fork 33. An air outlet opening 43 interconnecting channel 41 to the space in clutch housing 12 is formed at a front face in the vicinity of the annular part 34 of the release fork 33. Moreover, an air exhaust port 44, for exhausting air from the clutch housing 12 is formed at an outer peripheral part of the clutch housing 12.

Function will be described hereunder. Under a state wherein the (not-shown) clutch pedal is not depressed, the lower end of the release fork 33 is not pivoted by the link rod 40 in the direction of X1. Accordingly, the diaphragm spring 25 is in an extended state with the wire rings 27 fulcrumed, and the pressure plate 17 is pressed to the flywheel 13 side by the spring force of the diaphragm spring 25 to grip the facing 19 between the flywheel 13 and the pressure plate 17. In this clutch engaged state, torque from the flywheel 13 is transmitted through the clutch disc 18 to the output shaft 14 and a torque vibration, if it occurs, is absorbed by the damper mechanism 20.

When the clutch pedal is depressed, the link rod 40 moves to the right, FIG. 1, to pivot the release fork 33 in the direction X1. Thereby, the release bearing 30 is moved forward to press the inner peripheral end of the diaphragm spring 25 in the forward direction. The pressure plate 17 is pulled backward when the diaphragm spring 25 is compressed. Thus the clutch is brought into the disengaged state.

On the other hand, the clutch cover 15 and the pressure plate 17 etc. rotate integrally with the flywheel 13, and air around the clutch is sucked through the clearance B at the central part of the clutch cover assembly into the clutch cover 15 and flows out through the clearance A at the outer periphery of the clutch cover assembly. As the result, the air is led from an outside of the clutch housing 12 through the air inlet opening 42, the space 41 and the air outlet opening 43 into the clutch central part in the clutch housing 12. Then, the air is sucked from the clearance B into the clutch cover 15 to cool the pressure plate 17 and the facing 19 etc. Thereafter, the air is exhausted from the clearance A through the air exhaust port 44 to the outside of the clutch housing 12.

(Effect of the Invention)

The release fork 33 projects out of the clutch housing 12 and is connected to the clutch operating mechanism. The release fork 33 is a hollow and the air outlet opening 43 and the air inlet opening 42 are provided on the release fork 33 at both the inside and outside of the clutch housing 12, respectively, so that the following advantages are obtainable:

(1) The necessity of using the special purpose suction pipe is eliminated. Further, the necessity of special working of the clutch housing for attaching of the special pipe is not necessary.

(2) The temperature in the clutch assembly can be lowered without increasing the quantity of component and, at the same time, the clutch mechanism can be simplified and the clutch weight can be reduced (Another embodiment)

Figure 2:
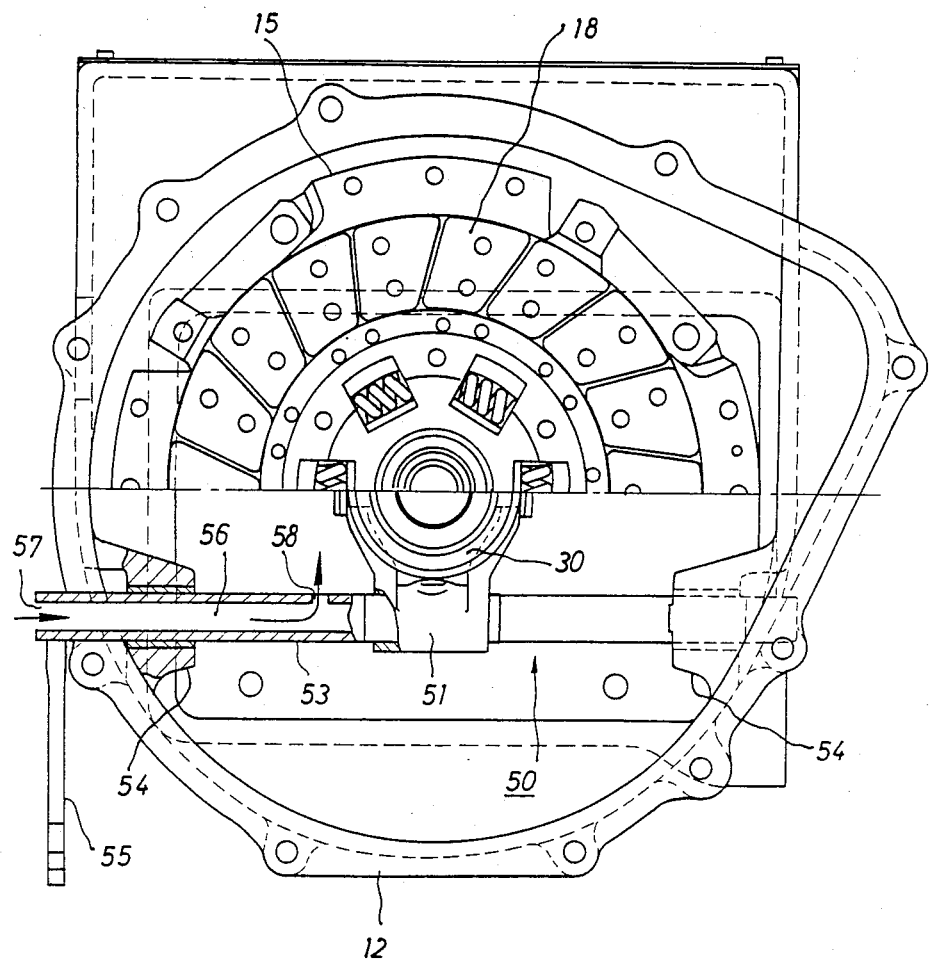
FIG. 2 is a vertical sectional rear view of another embodiment.

This invention may also be employed in a clutch of a type illustrated in FIG. 2. In FIG. 2, a fork section 51 provided at a central portion of a release fork 50 opens upward and its tip end contacts with a release bearing 30. A base of the fork section 51 is fixed integrally to a central part of a pipe 53, and the pipe 53 is disposed horizontally and at right angle to the output shaft 14 at a slightly lower position than the release bearing 30. Both ends of the pipe 53 are supported freely rotatably by bosses 54 formed on the clutch housing 12. A base of a lever 55 is fixed to a left end of the pipe 53 projecting leftward from the clutch housing, and a clutch operating mechanism, not shown, (for example, a clutch pedal) is connected to a lower end of the lever 55.

The pipe 53 is a cylindrical member having a space 56 in its inside. Air inlet openings 57, openings to an outside of the clutch housing 12, are provided on both ends thereof, and an air outlet opening 58 opening to a space in the clutch housing in the vicinity of the release bearing 30 is formed at a part near to the central portion of the pipe 53.

In this case, air at the outside of the clutch housing 12 is drawn, by rotation of the clutch, through the air inlet openings 57, the space 56 and the air outlet opening 58 to an approximately central part of the clutch housing inside.

What is claimed is:

1. In a clutch having a housing and a release fork with a clutch release bearing on said release fork at the center of said clutch in said housing, said fork having one end projecting out of said clutch housing and extending from said release bearing at the center of said clutch in said housing to said one projecting end horizontally and at right angle to an output shaft of said clutch at a position slightly lower than said output shaft and said release bearing, the projecting end of said fork being fitted into a boss formed on said clutch housing and being freely rotatably supported thereby, a lever fixed at its base end to said end of said fork projecting outward from said clutch housing said lever being free at its opposite end, a clutch operating mechanism connected to said free end of said lever and an air passage extending through said fork from said projecting end to said release bearing, said air passage having an air inlet opening at said projecting end and an air outlet opening at said release bearing end.

* * * * *